United States Patent Office 2,981,630
Patented Apr. 25, 1961

2,981,630

CLAY PRODUCTS AND FRACTIONATION TREATMENT OF HETEROGENEOUS AGGREGATES SUCH AS CLAY

Ben W. Rowland, Hillside N.J., assignor to Georgia Kaolin Company, Elizabeth, N.J., a corporation of New Jersey No Drawing. Filed Apr. 26, 1951, Ser. No. 223,137

45 Claims. (Cl. 106—288)

This invention relates to a new clay product and a method of treatment of heterogeneous aggregates which is herein particularly described as applied to the fractionation of clay although, as will appear, it has numerous other applications.

This application is a continuation-in-part of my copending application Serial No. 68,386, filed December 30, 1948 (now abandoned).

A large commercial use for clay is in the coating of paper. Coating of the paper is effected by dispersing the clay in water, together with an adhesive such as starch or casein and applying a layer of the coating mixture to the paper base. The clay must have certain physical attributes in order to be satisfactory for paper coating. For example, if the coating mixture has too much "body" or viscosity it will not flow readily in the coating operation and will hinder the penetration of the starch into the base paper to such an extent that the coating is not sufficiently well anchored to the sheet to withstand the pull of tacky inks in printing. Moreover, the printing quality and ink absorption may also be unsatisfactory because of the formation of a relatively impervious barrier to the penetration and acceptance of oil ink vehicles. On the other hand, if the coating clay characteristics be at the other extreme, there will be too much penetration of the base paper by the coating adhesive and the coating itself will be so unstable that it will "pick" out on printing with tacky printing inks. However, the proper coating viscosity for a given paper is related to the porosity or absorption quality of the paper; that is, a porous paper will require a more viscous coating than a paper of lesser porosity. Accordingly, a clay which is satisfactory for one type of coating will not necessarily be satisfactory for another. Most natural clays are too viscous for paper coating so that the problem is ordinarily one of reducing the viscosity rather than increasing it. Moreover, the tendency of the industry has been towards clay of lesser viscosities. For these reasons it is highly desirable that a source of low viscosity clay be available for paper coating.

The problem of viscosity control is further complicated by the fact that various native clays show deviations from the ordinary or Newtonian viscosity when subjected to shear. Such deviations under shearing stress may be termed non-Newtonian viscosities and are divided into two types: (1) False body (often called thixotropy) and (2) Dilatancy. False body is a type of non-Newtonian viscosity which exhibits a progressively lower apparent viscosity with increasing rates of shear. Dilatancy is a type of non-Newtonian viscosity which exhibits a progressively greater apparent viscosity with increasing rates of shear. These non-Newtonian viscosity deviations of clay are of great importance in paper coating practices since they affect the flow properties of a coating color containing such clays as it is applied to the paper. It is therefore desirable that crude clays which are made up of clays having both of these types of non-Newtonian viscosities be divided or fractionated into two fractions, each one predominantly made up of clay having a single type of non-Newtonian viscosity. In short, it is desirable that the false body clays be separated from the dilatant clays.

It has been found that many clays which are suitable from the standpoint of whiteness and apparent purity are of such nature that they cannot be satisfactorily refined by known methods into acceptable coating clays. Present methods of refinement consist largely in degritting, bleaching, and fractionating on the basis of particle size, but these practices have not served to overcome the properties inherent in many clay deposits or parts of clay deposits. Nor, as I have now discovered, have they served to develop the best qualities or yields in clays taken from many deposits which are known to provide acceptable coating clays.

It is general practice in various industries to completely deflocculate an aqueous suspension and permit a heavier component to settle by gravity from a finer suspended component. For example, it is the usual practice in the clay industry to deflocculate a clay slip and permit heavier particles of sand and mica to separate from suspended clay particles. Such separations do not serve to overcome the aforementioned undesirable properties inherent in many clay deposits or parts of clay deposits but is merely a discrimination based on particle size and weight.

The variation to be found in crude clays is indicated by the following tabulation of viscosities of three deposits of clay found in the "Fall line" district of Georgia. The viscosities were obtained by using the well-known Brookfield instrument and were recorded in centipoises at 10, 20, 50 and 100 r.p.m.

TABLE A

| Sample | Viscosity at— | | | | Percent Solids for Viscosity Test |
|---|---|---|---|---|---|
|  | 10 | 20 | 50 | 100 |  |
| #1 Crude | 11,200 | 7,800 | 9,280 | 8,800 | 67.5 |
| #2 Crude | 7,200 | 5,200 | 3,680 | 2,720 | 65 |
| #3 Crude | 220 | 164 | 134 | 136 | 71 |

Generally speaking, a clay having a viscosity of more than 700 centipoises at 10 r.p.m. in a suspension of 65–71% solids is unsatisfactory for coating most papers. The #1 and #2 crudes in the above tabulation are unsatisfactory because of their enormously high viscosity. Present practices afford no treatment whereby low-viscosity clay may be obtained from deposits exemplified by the #1 and #2 crudes. They are, however, readily amenable to my process.

I have discovered a method of fractionating a heterogeneous mixture of two or more solid fine particle components each of which is susceptible of deflocculation such as may be found, for example, in various clay deposits. The method of my invention comprises generally the steps of establishing an aqueous suspension of the mixture in a condition whereunder the several components are all defluocculated, adjusting the condition of the suspension so as to effect flocculation of at least one but not all of the components, precipitating the flocculated portion and separating the precipitate and the supernatant suspension. By this practice I am able to separate two or more clay fractions of different viscosity characteristics from one another. In this way I can separate the false body fraction of a clay from the dilatant fraction.

I have found that by the use of a hydrophilic colloidal material which is selectively adsorbed on the surfaces of at least one component of the mixture I can establish a novel type or mechanism of discrimination in aqueous dispersions of solids such as clay with an attendant control of physical properties. It is accordingly feasible by my invention to adjust the end product to a desired controlled figure; to utilize clay deposits or parts of clay deposits heretofore deemed impossible of refinement into coating clay; to effect greater refinement of clay from presently acceptable deposits; and generally to exercise an improved control of quality.

The separation which is characteristic of my invention is effected by substances possessing the characteristics of hydrophilic colloids. The one thing which all of the substances used in my invention have in common is that they all, without exception, conform to the most authoritative definitions of hydrophilic colloid regardless of origin, chemical composition, electrostatic nature or the mechanism by which they spontaneously assume the hydrophilic colloidal state in water. The materials I prefer to use are the hydrophilic colloids which, when formed as a gel with borax, shrink in the presence of a neutral salt. This however is not to be considered a limitation on the class.

I have found that among the hydrophilic colloidal materials which are suitable for effecting the separation according to my invention are the poly-aliphatic-hydroxy polymers or carbohydrate polymers and their water-suspensible derivatives such as manno-galactan, glucomannan, hydroxyethylcellulose, extract of Jack-in-the-pulpit bulb and green seeds, extract of calla lily bulb, extract of iris bulb and synthetic polymers such as water-dispersible colloidal polymers of urea-formaldehyde and styrene-maleic acid.

*Manno-galactan*

Of the aforementioned materials which are effective in carrying out the separation of my invention I prefer the manno-galactans, however, the other hydrophilic colloidal materials are equally effective.

The manno-galactans are presently commercially derived from the endosperm of the seeds of ceretonia, siliqua, *Cyamopsis tetragonoloba*. They are also derivable from the endosperm of other leguminous seeds, e.g., those of *Gleditsia triancanthos* and *Gymnocladus dioicous*. They may also be found in other plant materials and it is possible that they may ultimately be synthesized. Chemically, they are highly polymerized sugar complexes consisting of the two sugars mannose and galactose in proportions which vary somewhat with the source. They are available as white powdered products generally resembling starch in appearance. My researches indicate that all of the polymerized sugar complexes which are classified as manno-galactans and which can be made water-soluble are suitable for the practice of my invention.

EXAMPLE 1

A quantity of crude clay of the character designated as Crude #1 in Table A was mixed with water to give a conveniently handleable slip. The slip was subjected to a stirring and shearing action in the presence of 0.3% sodium hexametaphosphate as the dispersing agent. The dispersed clay slip was then allowed to stand quietly to permit degritting by gravity settling. All of these steps are well-known in the prior art.

I next added to the clay slip with rapid stirring an amount of manno-gelactan solution equivalent to about 0.02% of the clay, both the weight of the clay and the manno-galactan being computed on a dry weight basis. The clay slip was approximately neutral, being in the pH range of about 6 to 8 pH. The manno-galactan solution was diluted to about 0.025% concentration prior to its addition to the clay in order to insure rapid mixing and to minimize local concentration effects.

After the manno-galactan was stirred into the clay slip a fraction was separated by sedimentation. The precipitated portion was the lower viscosity fraction while the supernatant liquid contained the more viscous fraction.

The separation was not that of removal by settling or centrifuging of coarse from fine clay in a dispersed slip in the usual sense but was rather the removal of a turbid supernatant from a well-defined coagulum, the latter having been formed from a less viscous portion of the clay by the action of manno-galactan.

The results of this fractionation are tabulated in the following table.

TABLE B

| Sample | Amount of Low Viscosity Fraction on Original Crude, Percent | Viscosity in Centipoises | | | | Percent Solids for Viscosity Test |
|---|---|---|---|---|---|---|
| | | 10 r.p.m. | 20 r.p.m. | 50 r.p.m. | 100 r.p.m. | |
| #1 Crude | | 11,200 | 7,800 | 9,280 | 8,800 | 67.5 |
| Low Viscosity fraction of #1 Crude | 69 | 360 | 315 | 308 | 395 | 68 |
| High visc. fraction of #1 Crude | Too viscous to measure at 57% solids. | | | | | |

EXAMPLE 2

Fractionation of a quantity of clay similar in character to that designated as Crude #2 in Table A was carried out in the same manner as that for Crude #1 with the following results.

TABLE C

| Sample | Amount of Low Viscosity Fraction on Original Crude, Percent | Viscosity in Centipoises | | | | Percent Solids for Viscosity Test |
|---|---|---|---|---|---|---|
| | | 10 r.p.m. | 20 r.p.m. | 50 r.p.m. | 100 r.p.m. | |
| #2 Crude | | 7,200 | 5,200 | 3,680 | 2,720 | 65 |
| Low visc. fraction from #2 Crude | 77 | 152 | 112 | 86.4 | 88 | 65 |
| High visc. fraction from #2 Crude | Too viscous to measure at 57% solids. | | | | | |

EXAMPLE 3

Clays which are presently considered satisfactory for paper coating may be substantially improved by fractionating according to my invention, as will appear from the present example. Fractionation of a clay similar to that designated as Crude #3 in Table A was carried out in the same manner as the fractionation of Crude #1. The improvement in viscosity behavior after fractionation is clearly apparent in the following table.

TABLE D

| Sample | Amount of Low Viscosity Fraction on Original Crude, Percent | Viscosity in Centipoises | | | | Percent Solids for Viscosity Test |
|---|---|---|---|---|---|---|
| | | 10 r.p.m. | 20 r.p.m. | 50 r.p.m. | 100 r.p.m. | |
| #3 Crude | | 220 | 164 | 134 | 136 | 71 |
| Low visc. fraction from #3 Crude | 89 | 152 | 114 | 91 | 97 | 71 |
| Higher viscosity fraction from #3 Crude | Too viscous to measure at 68% solids. | | | | | |

EXAMPLE 4

Within limits the viscosity of the precipitated fraction may be controlled by adjusting the treatment. In the example tabulated in Table E a series of separate clay slips formed from equal amounts of the same high viscosity clay were treated in the same manner as in the fractionation of crude clay #1 excepting that the percent of manno-galactan on the total clay was varied in each case as appears in the left-hand column.

TABLE E

| Percent Manno-galactan on total clay | Amount of fraction as percent on Total | Viscosity at 10 r.p.m. of fraction at 66% Solids, cp. |
| --- | --- | --- |
| 0.0075 | 22 | 8,000 |
| 0.01 | 27 | 27,600 |
| 0.0125 | 27 | 30,800 |
| 0.015 | 30 | 40,400 |
| 0.0175 | 33 | 71,600 |

The crude clay in this case was too viscous to measure at 66% solids and gave 132,000 c.p. at 62% solids.

EXAMPLE 5

A series of separate clay slips formed from equal amounts of the same medium viscosity clay were treated in the same manner as the high viscosity clay of Example 4 with the following results.

TABLE F

| Percent Manno-galactan on total clay | Amount of fraction as percent Total | Viscosity at 10 r.p.m. of fraction at 66% Solids, cp. |
| --- | --- | --- |
| 0.005 | 43 | 480 |
| 0.0075 | 52 | 700 |
| 0.01 | 58 | 850 |
| 0.015 | 65 | 875 |
| 0.02 | 70 | 1,100 |
| 0.03 | 79 | 1,300 |

The crude clay in the example had a viscosity of 900 cp. at 68% solids, showing that in this instance there was some clay present less viscous than the crude and some more viscous.

It is apparent from Examples 4 and 5 that a preselected viscosity fraction can be readily obtained from a given clay by controlling the percent of manno-galactan addition on the total clay.

EXAMPLE 6

A crude clay was also separated into fractions of increasing false body characteristics and fractions of increasing dilatancy characteristics as follows: The clay was formed into a slip with water, degritted and stabilized by the addition of 0.3% polyphosphate. Separate portions of the slip were taken and stepwise increasing amounts of manno-galactan were added according to the present invention and in amounts as indicated in Table G below. Table G is a comparative table of amounts of manno-galactan used, percent yield, apparent viscosity (Brookfield) at 10 and 100 r.p.m. and the Newtonian deviation factor. The Newtonian deviation factor is merely an arbitrary factor derived by subtracting the apparent viscosity at 100 r.p.m. from the apparent viscosity at 10 r.p.m., dividing this result by the viscosity at 10 r.p.m. and multiplying by 100. In short, the Newtonian deviation factor may be found from the following mathematical expression $$\left(\frac{V^{10} - V^{100}}{V^{10}}\right)100$$

TABLE G

LOW VISCOSITY FRACTIONS

| Percent Manno-galactan | Percent Yield | Brookfield Visc. | | Newtonian Deviation Factor $\left(\frac{V^{10}-V^{100}}{V^{10}}\right)100$ |
| --- | --- | --- | --- | --- |
| | | 10 | 100 | |
| 0 (control) | 100 | 400 | 184 | 54 |
| .0025 | 36 | 160 | 159 | 0 |
| .005 | 58 | 200 | 151 | 25 |
| .0125 | 72 | 224 | 158 | 29 |
| .05 | 90 | 320 | 166 | 48 |

HIGH VISCOSITY FRACTIONS

| | | | | |
| --- | --- | --- | --- | --- |
| .0025 | 64 | 320 | 152 | 53 |
| .005 | 42 | 600 | 192 | 68 |
| .0125 | 28 | 664 | 227 | 67 |
| .05 | Insufficient clay for viscosity determination. | | | |

The results shown in Table G mean that the manno-galactan is actually separating progressively fractions which differ among themselves not only in regard to actual viscosity, but also in respect to type of viscosity, a matter of considerable importance in coating clays where type of viscosity as well as magnitude is critical for the production of good coatings.

In the examples given, the sol of manno-galactan was added to a previously formed dispersion of the clay. However, I have successfully interacted the two by the reverse procedure, i.e. by adding the dispersion of clay to a dilute aqueous sol of the manno-galactan.

The fraction of higher viscosity may be reclaimed from the supernatant liquid in any desired manner, e.g. by filtration.

In general, my method is unaffected by the solids concentration of the slip. The dispersing agent may be any of the well-known agents such as sodium hexametaphosphate, tetra-sodium pyrophosphate, sodium silicate etc. in an amount generally not exceeding 0.5% of the weight of the solids, although there are certain clays where the concentration of dispersing agent must exceed 0.5%.

The amount of manno-galactan required for fractionation may vary for different types of clay, generally between the limits of about 0.005% to about 0.05% of the clay, both weight of the clay and of the manno-galactan being computed on a dry weight basis. I have found, however, that while about 0.02% manno-galactan is suitable for most Georgia "Fall line" clays, more hydrous clays may require more, even in excess of 0.05%. The separation may be accelerated by the addition of a water-soluble inorganic salt. The most satisfactory salts are those which are stoichiometrically neutral such as sodium sulfate, sodium chloride, etc. The specific composition of salt appears to have nothing to do with the discriminatory action of the manno-galactan but merely increases the rate of precipitation.

I have found that a pH of about 6 to 8 is most satisfactory. If the pH rises above pH 8, a gross flocculation of the manno-galactan precipitated clay occurs, which carries down the more hydrous matter along with the precipitated less hydrous matter. At a pH below pH 6 the clay will ordinarily be flocculated by the acid state. The sedimentation after the addition of manno-galactan may be carried out by allowing the mixture to stand quietly until a gravity separation is effected, or by subjecting the clay slip to a centrifuging action. Where gravity separation is resorted to, the supernatant fraction is removed from the precipitate by decantation.

Gluco-mannan

Gluco-mannan is closely related chemically to manno-galactan, differing principally in the special configuration of the polymerized sugars making up the molecule. Gluco-mannan occurs in the tubers of the plant *Amorphophallus rivieri* and in other members of the *Amorphophal-*

*lus* family such as *Amorphophallus titanium*. The glucomannan may be extracted from the tubers by hot water.

EXAMPLE 7

A crude secondary clay from a commercially-worked deposit in Georgia was vigorously stirred in water in the presence of 0.3% sodium hexametaphosphate as dispersant to form a 25% slurry. The resulting slip was allowed to stand for ½ hour to degrit and the supernatant clay was treated with a dilute solution of material extracted from bulbs of *Amorphophallus rivieri*, containing 0.12% extracted solids of weight of clay (dry basis). Fractionation of the clay was observed to take place and, after 4 hours, the two fractions were separated by siphoning, separately treated with aluminum chloride to facilitate filtering, filtered and dried in air at 110° C.

After drying, the two fractions were found to have different viscosities and to exhibit a different demand for dispersant. The lower viscosity fraction amounted to 58% by weight of the treated clay and the higher viscosity fraction (42%) made up the balance. The character of the two fractions is best compared by referring to Table H below.

TABLE H

| Fraction, percent | Sodium Hexametaphosphate demand, percent | Viscosity (Brookfield) cp. | | | 71% Solids, 100 r.p.m. |
|---|---|---|---|---|---|
| | | 10 r.p.m. | 20 r.p.m. | 50 r.p.m. | |
| 58 | 0.25 | 220 | 1.80 | 140 | 154 |
| 42 | 0.35 | 440 | 280 | 172 | 154 |

It is apparent from the above data, that gluco-mannan, although required in considerably greater amounts than manno-galactan, does effect a selective flocculation of clay materials and accordingly a corresponding fractionation.

Hydroxyethylcellulose

Cellulose is a polyhydroxy alcohol and hence is able to form ethers such as hydroxyethylcellulose with various alkylating agents. Hydroxyethylcellulose so formed is suitable in the process of the present invention. In applying this material to the process of my invention a quantity of crude secondary Georgia clay was treated as follows:

EXAMPLE 8

The crude clay was vigorously stirred in water in the presence of 0.3% of sodium hexametaphosphate as dispersant to form a 30% slip. This slip was permitted to stand for ½ hour to allow grit and coarse material to settle out. The supernatant was then removed and diluted to 20% solids and adjusted to a pH of 7.8 with ammonium hydroxide. To each 100 grams of suspended clay solids was added with stirring, 0.0025 gram of hydroxyethylcellulose solids in the form of about 1/20% aqueous solution. Within a few minutes the suspension separated into two distinct layers and after three hours standing the two fractions were separated by siphoning, treated with aluminum chloride to facilitate filtering, filtered and air dried at 110° C.

After drying one fraction contained about 80% of the original clay and the other contained the remaining 20%. The character of these two fractions will be apparent from Table I.

TABLE I

| Fraction, percent | Sodium hexametaphosphate demand, percent | Viscosity (Brookfield) | | | 71% Solids, 100 |
|---|---|---|---|---|---|
| | | 10 | 20 | 50 | |
| 80 | 0.2 | 440 | 340 | 248 | 224 |
| 20 | 0.35 | 800 | 520 | 312 | 232 |

Other hydrophilic colloids

Other hydrophilic colloids both natural and synthetic when added to a suspension of clay particles will produce a like fractionation. For example, water-dispersible colloidal polymers of the styrene-maleic acid type, the sodium salt of hydrolyzed polyacrylonitrile and polymers of ureaformaldehyde when added to clay slips will produce a fractionation of the slip into two portions of different viscosity levels.

My researches have shown that the separation or discrimination resulting from the practice of my invention is not simply in furtherance of a particle size discrimination. I believe the discrimination depends upon differences between the different hydration qualities of different sorts of clay particles within the aggregate. An aqueous clay dispersion is a heterogeneous mixture, different particles having different degrees of stability in colloidal suspension. I believe that the hydrophilic colloid such as manno-galactan causes the less hydrous particles to agglomerate into clusters and fall out of suspension as a precipitate, leaving the more hydrous particles behind in stable suspension. This theory is consistent with the observed facts and accounts for the precipitation from the suspension of particles which, absent the hydrophilic colloid, e.g. the manno-galactan, would be stable in suspension. However, I do not bind myself to this theory.

In addition to crude clay, I have applied the process to other heterogeneous aggregates such as fuller's earth, garden soil, bauxite and natural earth colors such as ochres and umbers. It appears to be generally applicable to heterogeneous aggregates of solid fine particles and to establish a type or mechanism of discrimination not heretofore known or realized. In certain situations, notably in the case of coating clays it effects a material change in viscosity; in natural earth colors it effects a notable discrimination in color.

In the examples of clay treatment which I have given I have laid emphasis upon the adjustment of viscosity downwardly because as has been stated most natural clays are too viscous for paper coating. It should be borne in mind, however, that my invention contemplates an adjustment of the viscosity upwardly if that should be desirable. In the treatment of fuller's earth, for example, the more viscous fraction may be preferred for certain purposes such as drilling mud. Blending of different amounts of the several fractions may also be utilized in particular cases. Accordingly, it will be understood that while I have illustrated and described a present preferred application of my invention, it may be otherwise embodied or practiced within the scope of the following claims.

I claim:

1. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture wherein the several components are all deflocculated, adjusting the condition of the suspension by adding thereto a hydrophilic colloidal material capable of being adsorbed substantially only on the surfaces of those components having common adsorptive characteristics in the presence of a deflocculant for said mixture whereby said components of common adsorptive characteristics are caused to flocculate, precipitating the flocculated portion, maintaining the balance of the components in the deflocculated state in the presence of said deflocculant, and separating the precipitate and the supernatant suspension containing the balance of the components.

2. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture wherein the several components are all deflocculated, adjusting the condition of the suspension so as to effect flocculation of one but not all of the components by adding thereto an aqueous colloidal sol of a hydrophilic colloidal material which is selectively adsorbed on the surfaces of the particle of at least one but not all of said components in the presence of a deflocculant for said mixture whereby the components upon which the hydrophilic colloidal material is adsorbed are flocculated, precipitating the flocculated portion, maintaining the balance of the components in the deflocculated state in the presence of said deflocculant, and separating the precipitate and the supernatant suspension containing the unflocculated components.

3. A method of fractionating clay of two or more clay components of differing adsorptive characteristics, each susceptible of deflocculation, comprising the steps of establishing an aqueous suspension of the mixture wherein the several components are all deflocculated, adjusting the condition of the suspension by adding thereto a hydrophilic colloidal material capable of being adsorbed substantially only on the surfaces of those components having common adsorptive characteristics in the presence of a deflocculant for said mixture whereby said components of common adsorptive character are caused to flocculate, precipitating the flocculated portion, maintaining the balance of the components in the deflocculated state in the presence of said deflocculant, and separating the precipitate and the supernatant suspension containing the unflocculated components.

4. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture in a condition whereunder the several components are all deflocculated, adjusting the condition of the suspension so as to effect flocculation of at least one but not all of the components by adding thereto one of the group consisting of manno-galactan, gluco-mannan, hydroxyethylcellulose, a styrene-maleic acid polymer, a water-dispersable urea-formaldehyde polymer and the sodium salt of hydrolyzed polyacrylonitrile, precipitating the flocculated portion and separating the precipitate and supernatant suspension.

5. A method of fractionating a heterogeneous aggregate of solid fine particles which comprises interacting an aqueous dispersion of the solid to be fractionated with an aqueous colloidal sol of one of the group consisting of manno-galactan, gluco-mannan, hydroxyethylcellulose, a styrene-maleic acid polymer, a water-dispersable urea-formaldehyde polymer and a sodium salt of hydrolyzed polyacrylonitrile, and separating a fraction by sedimentation.

6. A method of fractionating an aqueous dispersion of heterogeneous fine particles which comprises interacting an aqueous colloidal sol of one of the group consisting of manno-galactan, gluco-mannan, hydroxyethylcellulose, a styrene-maleic acid polymer, a water-dispersable urea-formaldehyde polymer and the sodium salt of hydrolyzed polyacrylonitrile with the dispersion, the group member being added in a controlled ratio to the mass whereby to control the separated fraction, and separating said fraction by sedimentation.

7. A method of fractionating an aqueous dispersion of heterogeneous fine particles which comprises interacting an aqueous dispersion of the solid to be fractionated, the dispersion containing a salt, with an aqeuous colloidal sol of one of the group consisting of manno-galactan, gluco-mannan, hydroxethylcellulose, a styrene-maleic acid polymer, an urea-formaldehyde polymer and the sodium salt of hydrolyzed polyacrylonitrile, and separating a fraction by sedimentation.

8. A method of fractionating clay comprising the steps of interacting an aqueous dispersion of the clay to be fractionated with one of the group consisting of manno-galactan, gluco-mannan, hydroxyethylcellulose, a styrene-maleic acid polymer, a water-dispersable urea-formaldehyde polymer and the sodium salt of hydrolyzed polyacrylonitrile, and separating a fraction by sedimentation.

9. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture in a condition whereunder the several components are all deflocculated, adjusting the condition of the suspension so as to effect flocculation of at least one but not all of the components by adding thereto manno-galactan, precipitating the flocculated portion and separating the precipitate and the supernatant suspension.

10. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture in a condition whereunder the several components are all deflocculated, adjusting the condition of the suspension so as to effect flocculation of at least one but not all of the components by adding thereto gluco-mannan, precipitating the flocculated portion and separating the precipitate and the supernatant suspension.

11. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture in a condition whereunder the several components are all deflocculated, adjusting the condition of the suspension so as to effect flocculation of at least one but not all of the components by adding thereto hydroxyethylcellulose, precipitating the flocculated portion and separating the precipitate and the supernatant suspension.

12. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture in a condition whereunder the several components are all deflocculated, adjusting the condition of the suspension so as to effect flocculation of at least one but not all of the components by adding thereto a styrene-maleic acid polymer, precipitating the flocculated portion and separating the precipitate and the supernatant suspension.

13. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture in a condition whereunder the several components are all deflocculated, adjusting the condition of the suspension so as to effect flocculation of at least one but not all of the components by adding thereto a urea-formaldehyde polymer, precipitating the flocculated portion and separating the precipitate and the supernatant suspension.

14. A method of fractionating a heterogeneous aggregate of solid fine particles which comprises interacting an aqueous dispersion of the solid to be fractionated with an aqueous colloidal sol of a manno-galactan, and separating a fraction by sedimentation.

15. A method of fractionating an aqueous dispersion of heterogeneous fine particles which comprises interacting an aqueous colloidal sol of a manno-galactan with the dispersion, the manno-galactan being added in a controlled ratio to the mass whereby to control a separated fraction, and separating said fraction by sedimentation.

16. A method of fractionating clay which comprises interacting an aqueous dispersion of the clay to be fractionated with an aqueous colloidal sol of a manno-galactan, and separating a fraction by sedimentation.

17. A method of fractionating clay which comprises interacting an aqueous dispersion of the clay to be fractionated with an aqueous colloidal sol of a manno-galactan, the manno-galactan being added in a controlled ratio to the mass whereby to control a separated fraction, and separating a fraction by sedimentation.

18. A method of fractionating clay which comprises interacting an aqueous dispersion of the clay to be fractionated with an aqueous colloidal sol of a manno-galactan whose dry weight is equal to about 0.005% to 0.05% of the dry weight of the clay, and separating a fraction by sedimentation.

19. A method of fractionating clay which comprises interacting an aqueous dispersion of the clay to be fractionated with an aqueous colloidal sol of a manno-galactan whose dry weight is equal to about 0.02% of the dry weight of the clay, and separating a fraction by sedimentation.

20. A method of fractionating clay which comprises interacting an aqueous dispersion of the clay to be fractionated with an aqueous colloidal sol of a manno-galactan sufficient to precipitate a fraction of lower viscosity, and separating the fraction precipitated.

21. A method of fractionating clay which comprises interacting an aqueous dispersion of the clay to be fractionated with an aqueous colloidal sol of manno-galactan sufficient to precipitate a fraction of lower viscosity, and reclaiming a fraction of higher viscosity from the supernatant liquid.

22. A method of fractionating clay which comprises forming an aqueous dispersion of the clay to be fractionated, the dispersion containing a salt, with an aqueous colloidal sol of a manno-galactan, and separating a fraction by sedimentation.

23. A method of fractionating an aqueous dispersion of heterogeneous fine particles which comprises interacting an aqueous dispersion of the solid to be fractionated with an aqueous colloidal sol of a manno-galactan whose dry weight is equal to about 0.005% to 0.05% of the dry weight of the solid, and separating a fraction by sedimentation.

24. A method of fractionating an aqueous dispersion of heterogeneous fine particles which comprises interacting an aqueous dispersion of the solid to be fractionated, the dispersion containing a salt, with an aqueous colloidal sol of a manno-galactan, and separating a fraction by sedimentation.

25. A method of fractionating clay which comprises interacting an aqueous dispersion of the clay to be fractionated with an aqueous colloidal sol of a gluco-mannan, and separating a fraction by sedimentation.

26. A method of fractionating clay which comprises interacting an aqueous dispersion of the clay to be fractionated with an aqueous colloidal sol of a gluco-mannan, the gluco-mannan being added in a controlled ratio to the mass whereby to control a separated fraction, and separating a fraction by sedimentation.

27. A method of fractionating an aqueous dispersion of heterogeneous fine particles which comprises interacting an aqueous colloidal sol of a gluco-mannan with the dispersion, the gluco-mannan being added in a controlled ratio to the mass whereby to control a separated fraction, and separating a fraction by sedimentation.

28. A method of fractionating clay which comprises interacting an aqueous dispersion of the clay to be fractionated with an aqueous colloidal sol of a gluco-mannan sufficient to precipitate a fraction of lower viscosity, and separating the fraction precipitated.

29. A method of fractionating clay which comprises interacting an aqueous dispersion of the clay to be fractionated with an aqueous colloidal sol of a gluco-mannan sufficient to precipitate a fraction of lower viscosity, and reclaiming a fraction of higher viscosity from the supernatant liquid.

30. A method of fractionating clay which comprises forming an aqueous dispersion of the clay to be fractionated, the dispersion containing a salt, with an aqueous colloidal sol of a gluco-mannan, and separating a fraction by sedimentation.

31. A method of fractionating clay which comprises interacting an aqueous dispersion of the clay to be fractionated with an aqueous colloidal sol of hydroxyethylcellulose, and separating a fraction by sedimentation.

32. A method of fractionating clay which comprises interacting an aqueous dispersion of the clay to be fractionated with an aqueous colloidal sol of hydroxyethylcellulose, the hydroxyethylcellulose being added in a controlled ratio to the mass whereby to control a separated fraction, and separating a fraction by sedimentation.

33. A method of fractionating an aqueous dispersion of heterogeneous fine particles which comprises interacting an aqueous colloidal sol of hydroxyethylcellulose with the dispersion, the hydroxyethylcellulose being added in a controlled ratio to the mass whereby to control a separated fraction, and separating a fraction by sedimentation.

34. A method of fractionating clay which comprises interacting an aqueous dispersion of the clay to be fractionated with an aqueous colloidal sol of hydroxyethylcellulose sufficient to precipitate a fraction of lower viscosity, and separating the fraction precipitated.

35. A method of fractionating clay which comprises interacting an aqueous dispersion of the clay to be fractionated with an aqueous colloidal sol of hydroxyethylcellulose sufficient to precipitate a fraction of lower viscosity, and reclaiming a fraction of higher viscosity from the supernatant liquid.

36. A method of fractionating clay which comprises forming an aqueous dispersion of the clay to be fractionated, the dispersion containing a salt, with an aqueous colloidal sol of hydroxyethylcellulose, and separating a fraction by sedimentation.

37. A fractionated clay product characterized by being substantially free of dilatant viscosity characteristics and being the precipitate resulting from the interaction of an aqueous colloidal sol of manno-galactan with an aqueous dispersion of clay.

38. A fractionated clay product characterized by being substantially free of false body viscosity characteristics and being the supernatant fraction resulting from the interaction of an aqueous colloidal sol of manno-galactan with an aqueous dispersion of clay.

39. A fractionated clay product characterized by a low apparent viscosity and being the precipitate resulting from the interaction of an aqueous colloidal sol of manno-galactan with an aqueous dispersion of clay.

40. A fractionated clay product characterized by being substantially free of dilatant viscosity characteristics and being the precipitate resulting from the interaction of an aqueous colloidal sol of gluco-mannan with an aqueous dispersion of clay.

41. A fractionated clay product characterized by being substantially free of dilatant viscosity characteristics and being the precipitate resulting from the interaction of an aqueous colloidal sol of hydroxyethylcellulose with an aqueous dispersion of clay.

42. A fractionated clay product characterized by being substantially free of dilatant viscosity characteristics and being the precipitate resulting from the interaction of an aqueous colloidal sol of a styrene-maleic acid polymer with an aqueous dispersion of clay.

43. A fractionated clay product characterized by being substantially free of dilatant viscosity characteristics and being the precipitate resulting from the interaction of an aqueous colloidal sol of a water-dispersible urea-formaldehyde polymer with an aqueous dispersion of clay.

44. A method of fractionating heterogeneous naturally occurring ores and earth-type materials containing two or more solid fine particle components of differing adsorptive characteristics to hydrophilic colloidal materials, each said component susceptible of deflocculation, comprising the steps of establishing an aqueous suspension of the mixture wherein the several components are all deflocculated, adjusting the condition of the suspension so as to effect flocculation of at least one but not all of the components by adding thereto an aqueous colloidal sol of a hydrophilic colloidal material which is selectively adsorbed on the surfaces of the particles of said at least one component in the presence of a deflocculant for said mixture whereby the components upon which the hydrophilic colloidal material is adsorbed are flocculated, maintaining the balance of the components in the deflocculated state in the presence of said deflocculant, and separating the flocculated components and the supernatant suspension containing the unflocculated components.

45. A method of fractionating heterogeneous naturally occurring ores and earth-type materials containing two or more solid fine particle components of differing adsorptive characteristics to hydrophilic colloidal materials, each said components susceptible of deflocculation, comprising the steps of establishing an aqueous suspension of the mixture wherein the several components are all deflocculated, adjusting the condition of the suspension so as to effect flocculation of at least one but not all of the components by adding thereto an aqueous colloidal sol of manno-galactan which is selectively adsorbed on the surfaces of the particles of said at least one component in the presence of a deflocculant for said mixture whereby the components upon which the manno-galactan is adsorbed are flocculated, maintaining the balance of the components in the deflocculated state in the presence of said deflocculant, and separating the flocculated components and the supernatant suspension containing the unflocculated components.

References Cited in the file of this patent

UNITED STATES PATENTS

| | | |
|---|---|---|
| Re. 14,583 | Schwerin | Jan. 7, 1919 |
| 980,143 | Cartwright | Dec. 27, 1910 |
| 1,170,868 | Bachler | Feb. 8, 1916 |
| 1,324,958 | Feldenheimer | Dec. 16, 1919 |
| 1,925,058 | Rowland | Aug. 29, 1933 |
| 1,934,642 | Rafton | Nov. 7, 1933 |
| 2,117,378 | Tiffany | May 17, 1938 |
| 2,126,555 | Hugel | Aug. 9, 1938 |
| 2,158,987 | Maloney | May 16, 1939 |
| 2,305,404 | Brown | Dec. 15, 1942 |
| 2,394,083 | Lintz | Feb. 5, 1946 |
| 2,409,338 | Alton et al. | Oct. 15, 1946 |
| 2,569,680 | Leek | Oct. 2, 1951 |
| 2,570,947 | Himel | Oct. 9, 1951 |

FOREIGN PATENTS

| | | |
|---|---|---|
| 500,453 | Great Britain | Feb. 9, 1939 |
| 340,142 | Great Britain | Dec. 24, 1930 |
| 934,866 | France | Jan. 19, 1948 |

OTHER REFERENCES

Colloid Chemistry, Alexander, vol. VI © 1946 by Rheinhold Publishing Corp., New York, N.Y., page 332.

Needham, L. W., "Treatment of Washing Water," The Colliery Guardian, London, England, July 31, 1936, vol. CLIII, No. 3944, pages 191–197.